(12) United States Patent
Pannek et al.

(10) Patent No.: US 8,424,375 B2
(45) Date of Patent: Apr. 23, 2013

(54) METHOD FOR OPERATING A SENSOR ON OR IN A VEHICLE TIRE, AND A SENSOR SYSTEM

(75) Inventors: Thorsten Pannek, Stuttgart (DE); Marian Keck, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 356 days.

(21) Appl. No.: 12/733,088

(22) PCT Filed: Jul. 2, 2008

(86) PCT No.: PCT/EP2008/058502
§ 371 (c)(1),
(2), (4) Date: Aug. 16, 2010

(87) PCT Pub. No.: WO2009/024387
PCT Pub. Date: Feb. 26, 2009

(65) Prior Publication Data
US 2010/0294032 A1 Nov. 25, 2010

(30) Foreign Application Priority Data
Aug. 20, 2007 (DE) .......................... 10 2007 039 242

(51) Int. Cl.
*B60C 23/02* (2006.01)
(52) U.S. Cl.
USPC ........................................ 73/146.5; 702/138

(58) Field of Classification Search .................. None
See application file for complete search history.

(56) References Cited

U.S. PATENT DOCUMENTS

| | | | |
|---|---|---|---|
| 2007/0084276 A1* | 4/2007 | Matsuda et al. | 73/146 |
| 2007/0295069 A1* | 12/2007 | Mancosu et al. | 73/146 |
| 2008/0276700 A1* | 11/2008 | Polzin | 73/146.3 |
| 2009/0043517 A1* | 2/2009 | Matsuda et al. | 702/41 |
| 2009/0171531 A1* | 7/2009 | Kitazaki et al. | 701/37 |
| 2009/0228164 A1* | 9/2009 | Banerjee et al. | 701/22 |
| 2009/0302560 A1* | 12/2009 | Koguchi | 280/5.521 |
| 2010/0126263 A1* | 5/2010 | Brusarosco et al. | 73/146 |
| 2010/0295669 A1* | 11/2010 | Pannek | 340/438 |
| 2011/0118989 A1* | 5/2011 | Morinaga | 702/34 |

FOREIGN PATENT DOCUMENTS

| | | |
|---|---|---|
| JP | 2003-237861 | 8/2004 |
| JP | 2007-514176 | 5/2007 |
| WO | WO 01/87647 | 11/2001 |
| WO | WO 02/092364 | 11/2002 |
| WO | WO 2005/056311 | 6/2005 |

\* cited by examiner

*Primary Examiner* — Andre Allen
(74) *Attorney, Agent, or Firm* — Kenyon & Kenyon LLP

(57) ABSTRACT

A method for operating a sensor on or in a vehicle tire, in particular an acceleration sensor and in particular for detecting a tire rotation period and/or a tire contact period is provided, the sensor being operated in a first time interval of a tire rotation using a first query rate and in a second time interval of the tire rotation using a second query rate.

20 Claims, 1 Drawing Sheet

METHOD FOR OPERATING A SENSOR ON OR IN A VEHICLE TIRE, AND A SENSOR SYSTEM

BACKGROUND OF THE INVENTION

1. Field of the Invention

The present invention is based on a method for operating a sensor on or in a vehicle tire.

2. Description of Related Art

Sensor systems such as this are generally familiar. For example, WO 02/092 364 A2 describes a sensor array in which an acceleration sensor is disposed in the edge region of a vehicle tire and measures highly frequent changes of a tangential action of force on the acceleration sensor during a tire rotation. In order to detect the comparatively quickly occurring changes to the action of force in the rotating vehicle tire, a query of the acceleration sensor using a sufficiently high query rate is necessary. The disadvantage of this is that such a high query rate consumes a comparatively high amount of energy. This is a significant disadvantage in particular in battery-operated and/or energy-converter-operated acceleration sensors in vehicle tires.

SUMMARY OF THE INVENTION

The method according to the present invention for operating a sensor on or in a vehicle tire and the sensor array according to the present invention as recited in the independent claims have the advantage that operation of the sensor consumes considerably less energy relative to the related art, with unvarying functionality or measuring accuracy. This is achieved by a periodic operation of the sensor such that the sensor is operated using a comparatively high and thus energy-intensive query rate only in a relevant measuring range that is used to record the necessary measurement data, while in the remaining and less relevant measuring range the sensor is operated using an energy-saving lower query rate. Preferably, it is provided that the sensor is switched off in the less relevant measuring range. The relevant measuring range lies in particular in the first time interval, while the less relevant measuring range lies in the second time interval. Because, as a rule, the second time interval is significantly longer than the first time interval, a comparatively high energy savings is achieved particularly advantageously.

DETAILED DESCRIPTION OF THE INVENTION

Figure 1:
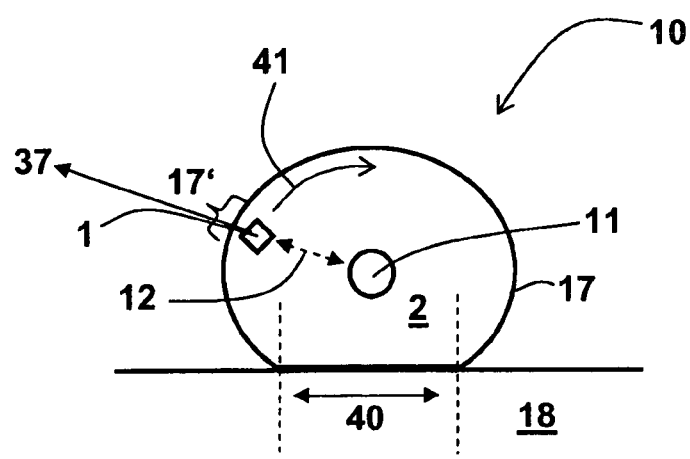
FIG. 1 shows a sensor array according to an exemplary embodiment of the present invention.

A periodic operation of the sensor is preferred, a cycle period being made up of the first and the second time interval. Consequently, the cycle period essentially corresponds to the rotation period of the vehicle tire. The relevant measuring data include the changes of the acceleration forces on the sensor during the transition of a sensor tire section into a tire contact area and out of the tire contact area. A processing of the time values of these transitions, which are able to be detected via the occurrence of relatively great changes of the acceleration forces, and/or a processing of the time period between two transitions allows for the determination of the tire contact period and/or the tire rotation period. The comparatively great changes to the acceleration forces arise in the transition region in that during the tire contact period essentially the gravitational force acts on the sensor and in the other region the effect of a centrifugal force brought about by a tire rotation dominates on the sensor. The sensor tire section includes a section of a tire's running surface that essentially overlaps the sensor in a radial direction. In the sense of the present invention, the tire contact surface refers to a contact region between the vehicle tire and a road surface, the tire contact period including a time period of a road-surface contact of an infinitesimal subregion of the tire's running surface during a tire rotation, and the tire rotation period including the time period for a tire rotation or a complete rotation of the tire by 360° relative to the tire axis. The time period of the second time interval is selected in particular as a function of the tire rotation period and the tire contact surface, so that preferably the second time interval is shorter than the tire rotation period less the tire contact period. By this means, it is ensured in a particularly advantageous manner that the sensor is operated at the first query rate only in the less relevant measuring range, while in the relevant measuring range, i.e., in the transition region or during the tire contact period of the sensor tire section, the sensor is operated at the second and in particular higher query rate. In particular, it is provided that the first and the second time intervals are constantly adjusted or optimized, especially in the case of changes in speed, so that the energy savings is maximized at a constant functionality and measuring accuracy. It is particularly advantageously possible to determine the tire contact surface, a tire circumference, the tire's running surface and/or an escape velocity of the tire's running surface as a function of the tire rotation period and/or the tire contact period. It is particularly preferable to provide for an adjustment of the query rates during operation and/or a detection (e.g., upper vibrations) of the tire rotation period by additional sensors, so that in particular the sensor is switched on only when entering the tire contact surface.

According to a preferred further refinement, the first time interval is smaller than the tire rotation period less the tire contact period, and the second time interval is greater than the tire contact period, the cycle period essentially corresponding to the tire rotation period. It is thus ensured in a particularly advantageous manner that the second time interval is situated at least in the entire relevant measuring range, while the first time interval lies outside of the relevant measuring range. By this means, the time values of the transitions are detected using a comparatively high query rate, while the query rate is low or equal to zero only for the time period in which no transitions occur.

According to an additional preferred refinement, before the periodic operation having the cycle period, the sensor is operated for the duration of a third time interval at a third query rate, in particular the third query rate being greater than the first query rate and less than the second query rate, and/or the third time interval including at least one tire rotation period and/or at least one tire contact period and preferably being used to determine the tire rotation period and/or the tire contact period. The determination of the tire contact period and/or the tire rotation period in a third time interval is provided for the initial determination of the first and/or the second time interval as a function of the tire contact period and/or the tire rotation period, in particular a comparatively approximate determination of the measurement variables being performed at a more approximate query rate than the second query rate. In particular, during a one-time passing through of the tire contact period, a rough estimate of the tire rotation period is possible, for example, via an empirical relation between tire rotation period and tire contact period of a vehicle tire having correct air pressure, the ratio of which is normally 90 to 10.

According to an additional preferred refinement, the time intervals having different query rates are set by an additional sensor and/or by an energy converter. Thus, the external detection of the tire rotation period is particularly advantageously implemented via additional sensors and/or via energy converters, e.g., a vibration sensor, the length of the time intervals being determined as a function of this externally determined tire rotation period.

According to an additional preferred refinement, a change to an action of force on the sensor and/or the time period between at least two changes to the action of force are measured by the sensor, and the corresponding time values are stored so that in a particularly advantageous manner a plurality of time values for determining the tire rotation period and/or the tire contact period are processed together.

According to an additional preferred refinement, a load measurement of a vehicle, a profile depth determination of the vehicle tire, and/or a condition determination of a road surface are/is performed, in particular as a function of the tire rotation period and/or the tire contact period, in the sense of the present invention the tire rotation period and the tire contact period being equivalent to the tire rotation speed and to the tire contact surface, respectively.

A further objective of the present invention is a sensor array for performing a method according to the present invention, the sensor array including a sensor, a counter, and a storage unit, at least the sensor being disposed in the vehicle tire, preferably in a region having a radius larger than zero relative to the vehicle tire axis. In a particularly advantageous manner, such a sensor array allows for a significantly more energy-saving determination of tire rotation periods and/or tire contact periods relative to the related art, in particular the sensor detecting the changes to the action force and during querying of the sensor, the respective time values of the counter being stored in the storage unit. Thus, a subsequent further processing of the time values to determine the tire rotation periods and/or tire contact periods is possible in a central processing unit, for example. Since in each instance only comparatively large changes of the action of force are detected, preferably the use of an analog-digital converter to read out the acceleration sensor using a comparatively low resolution is provided. Thus, the energy consumption of the sensor array may be reduced further.

FIG. 1 shows a sensor array 10 according to an exemplary embodiment of the present invention, a sensor 1, in particular an acceleration sensor, being disposed in a region of a vehicle tire 2 that has a radius 12 greater than zero relative to a vehicle tire axis 11, so that the sensor is located in particular in the region of a tire running surface 17. A tire contact surface 40 is formed by a contact region between tire running surface 17 and a road surface 18. A sensor tire section 17' includes a section of tire running surface 17, which overlaps sensor 1 essentially in a radial direction, parallel to radius 12. If sensor tire section 17' is positioned in tire contact surface 40 due to a rotation 41 of vehicle tire 2 around vehicle tire axis 11, then essentially the gravitational force (1g) acts on sensor 1 while a centrifugal force 37 acts on sensor 1 as soon as sensor tire section 17' is positioned outside of tire contact surface 40.

Figure 2:
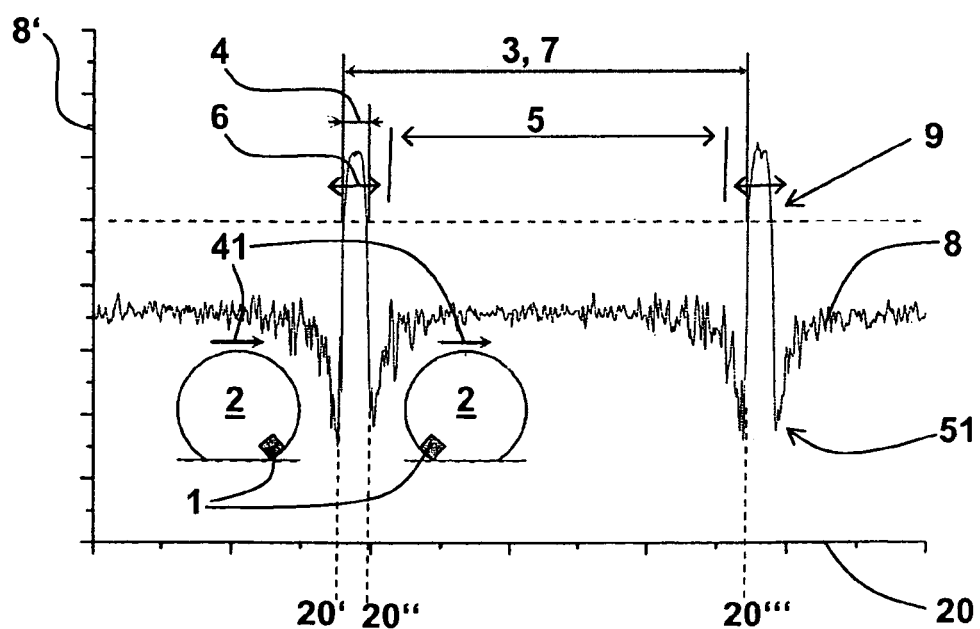
FIG. 2 shows a graphic representation of an action of force on the sensor in a sensor array according to the exemplary embodiment.

FIG. 2 illustrates a graphic representation of action of force 8 on sensor 1 in a sensor array 10 according to the exemplary embodiment, plotted against a time unit, an action of force scale being plotted on an ordinate 8' and a time scale being plotted on an abscissa 20. For a transition of sensor tire section 17' into tire contact surface 40 and out from tire contact surface 40 respectively, the curve of action of force 8 shows a comparatively great change 9, a difference between the corresponding first and second time value 20', 20" of these changes 9 encompassing a tire contact period 4. The difference between a third time value 20''', which characterizes the next cycle of a subsequent transition, and the first time value 20' encompasses tire rotation period 3, a first time interval 5 being situated in an interval that corresponds to tire rotation period 3 less tire contact period 4, a second time interval 6 being situated in the interval of tire contact period 4, and overlapping this interval in particular at a start time and at an end time. Preferably, it is possible to detect large changes 9 of the action of force early through a change in action of force curve 8, action of force curve 8 tending toward a local minimum 51 during these changes. A measurement of the time derivation of action of force curve 8 is provided, particularly preferably. In a third time interval, tire rotation period 4 and the times of a first transition t0, a subsequent second transition t1, and a third transition t3 following the second transition are stored initially using a comparatively low query rate of sensor 1, the consideration of additional transition times being possible to increase the exactness. It follows that the tire rotation time results from the difference of the third and the first transition t3-t1. From this it is now calculated at which time sensor tire section 17' will again transition into tire contact surface 40, sensor 1 then being switched off until this time for the duration of a first time interval 5. Shortly before this time, sensor 1 is switched on again at a relatively high second query rate, so that tire contact surface 40 is queried during a second time interval 6, additional time values of additional transitions being stored in the process. Tire rotation period 3 is calculated and/or corrected once again as a function of the additional time values, and sensor 1 is switched off for the duration of a newly calculated or corrected first time interval 5. Thus, the length of first and second time interval 5, 6 is constantly adjusted, so that a change in the vehicle speed, for example, is taken into account immediately. The difference between first time interval 5 and wheel tire rotation period 3 less wheel tire contact period 4 is in particular adjusted as a function of the speed of the vehicle, so that sudden acceleration or braking maneuvers of the vehicle do not lead to a loss of measured values in second time interval 6. Alternatively, an additional initial third time interval is provided, which only detects a tire contact period 4 and subsequently turns off sensor 1 immediately. Tire rotation period 3 is determined in this instance only as a function of tire contact period 5.

What is claimed is:

1. A method for operating a sensor on or in a vehicle tire, comprising detecting at least one of a tire rotation period and a tire contact period using an acceleration sensor, wherein the sensor is operated with a first query rate in a first time interval of a tire rotation, and with a second query rate in a second time interval of the tire rotation.

2. The method as recited in claim 1, wherein at least one of the time period of the first and second time interval is set as a function of at least one of a tire rotation period and a tire contact period.

3. The method as recited in claim 1, wherein the first time interval is greater than the second time interval, and the second query rate is greater than the first query rate.

4. The method as recited in claim 2, wherein the first time interval is greater than the second time interval, and the second query rate is greater than the first query rate.

5. The method as recited in claim 3, wherein the first query rate is zero.

6. The method as recited in claim 1, wherein the sensor is periodically operated with a cycle period that is made up of the first and second time interval.

7. The method as recited in claim 2, wherein the sensor is periodically operated with a cycle period that is made up of the first and second time interval.

8. The method as recited in claim 3, wherein the sensor is periodically operated with a cycle period that is made up of the first and second time interval.

9. The method as recited in claim 1, wherein the first time interval is smaller than the tire rotation period less the tire contact period, and the second time interval is greater than the tire contact period, and wherein the sensor is operated with a cycle period essentially corresponding to the tire rotation period.

10. The method as recited in claim 6, wherein before the periodic operation having the cycle period, the sensor is operated for the duration of a third time interval using a third query rate.

11. The method as recited in claim 7, wherein before the periodic operation having the cycle period, the sensor is operated for the duration of a third time interval using a third query rate.

12. The method as recited in claim 8, wherein before the periodic operation having the cycle period, the sensor is operated for the duration of a third time interval using a third query rate.

13. The method as recited in claim 10, wherein the third query rate is greater than the first query rate and less than the second query rate.

14. The method as recited in claim 11, wherein the third query rate is greater than the first query rate and less than the second query rate.

15. The method as recited in claim 10, wherein the third time interval encompasses at least one tire rotation period or at least one tire contact period.

16. The method according to claim 15, wherein the third time interval is used for determination of at least one of the tire rotation period and the tire contact period.

17. The method as recited in claim 1, wherein the time intervals having different query rates are specified by at least one of an additional sensor and an energy converter.

18. The method as recited in claim 1, wherein a modification of an action of force on the sensor or the time period between at least two modifications to the action of force are measured using the sensor, and corresponding time values are stored.

19. The method as recited in claim 1, wherein at least one of a load measurement of a vehicle, a profile depth determination of the vehicle tire, and a condition determination of a road surface is implemented.

20. A sensor array for implementing the method as recited in claim 1, comprising: a sensor, a counter, and a storage unit, at least the sensor being disposed in or on the vehicle tire, in a region having a radius greater than zero relative to the vehicle tire axis.

* * * * *

UNITED STATES PATENT AND TRADEMARK OFFICE
CERTIFICATE OF CORRECTION

PATENT NO.      : 8,424,375 B2           Page 1 of 1
APPLICATION NO. : 12/733088
DATED           : April 23, 2013
INVENTOR(S)     : Pannek et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 533 days.

Signed and Sealed this
Eighth Day of September, 2015

Michelle K. Lee
*Director of the United States Patent and Trademark Office*